United States Patent
Cramm et al.

(10) Patent No.: US 11,015,429 B2
(45) Date of Patent: May 25, 2021

(54) PASSIVE RANGING USING ACOUSTIC ENERGY ORIGINATING FROM A TARGET WELLBORE

(71) Applicant: Halliburton Energy Services, Inc., Houston, TX (US)

(72) Inventors: Carl J. Cramm, Spring, TX (US); Andrew John Cuthbert, Spring, TX (US); Joseph Eli Hess, Richmond, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 371 days.

(21) Appl. No.: 15/748,530

(22) PCT Filed: Sep. 10, 2015

(86) PCT No.: PCT/US2015/049408
§ 371 (c)(1),
(2) Date: Jan. 29, 2018

(87) PCT Pub. No.: WO2017/044103
PCT Pub. Date: Mar. 16, 2017

(65) Prior Publication Data
US 2018/0216452 A1    Aug. 2, 2018

(51) Int. Cl.
*E21B 47/022* (2012.01)
*E21B 47/10* (2012.01)
(Continued)

(52) U.S. Cl.
CPC .......... *E21B 47/0224* (2020.05); *E21B 44/00* (2013.01); *E21B 47/107* (2020.05);
(Continued)

(58) Field of Classification Search
CPC .. E21B 44/00; E21B 47/02208; E21B 47/101; G01V 1/284; G01V 1/305;
(Continued)

(56) References Cited

U.S. PATENT DOCUMENTS 3,282,355 A * 11/1966 Henderson .............. E21B 35/00
175/61
3,722,605 A * 3/1973 Isham ...................... E21B 7/06
175/40

(Continued)

FOREIGN PATENT DOCUMENTS

EP    0138271 B1    4/1989

OTHER PUBLICATIONS

International Search Report and Written Opinion issued in related PCT Application No. PCT/US2015/049408 dated May 10, 2016, 18 pages.
(Continued)

*Primary Examiner* — Daniel P Stephenson
(74) *Attorney, Agent, or Firm* — Thomas Rooney; Baker Botts L.L.P.

(57) ABSTRACT

In one or more embodiments, a system comprises a first (target) wellbore disposed in a formation, the first wellbore having a pressure imbalance therein causing an influx of formation fluids, a second (relief) wellbore disposed in the formation, a drill string disposed in the second wellbore, the drill string comprising a drill bit and a logging tool, and a wellbore ranging module comprising a processor and memory, the wellbore ranging module coupled to the drill string. The logging tool is configured to detect acoustic energy originating from the influx in the first wellbore and generate one or more signals associated with the detected acoustic energy. The wellbore ranging module is configured to receive, from the logging tool, the one or more signals
(Continued)

associated with the detected acoustic energy and determine, using the received signals, a direction from the drill bit to the influx of the first wellbore.

30 Claims, 3 Drawing Sheets

(51) Int. Cl.
| | |
|---|---|
| G01V 1/28 | (2006.01) |
| G01V 1/30 | (2006.01) |
| G01V 1/42 | (2006.01) |
| E21B 47/0224 | (2012.01) |
| E21B 44/00 | (2006.01) |
| G01V 1/52 | (2006.01) |
| E21B 47/107 | (2012.01) |

(52) U.S. Cl.
CPC .............. *G01V 1/284* (2013.01); *G01V 1/305* (2013.01); *G01V 1/42* (2013.01); *G01V 1/52* (2013.01); *G01V 2200/16* (2013.01); *G01V 2210/1234* (2013.01); *G01V 2210/1299* (2013.01); *G01V 2210/1429* (2013.01); *G01V 2210/6222* (2013.01); *G01V 2210/646* (2013.01)

(58) Field of Classification Search
CPC ........ G01V 1/42; G01V 1/52; G01V 2200/16; G01V 2210/1234; G01V 2210/1299; G01V 2210/1429; G01V 2210/6222; G01V 2210/646; F15C 1/16; F15D 1/0015; G21C 15/18; G21C 15/182; G21C 15/243; G21C 1/18; Y02E 30/40
See application file for complete search history.

(56) References Cited

U.S. PATENT DOCUMENTS

| | | | |
|---|---|---|---|
| 4,016,942 A * | 4/1977 | Wallis, Jr. ............... | E21B 7/046 |
| | | | 175/45 |
| 4,372,398 A | 2/1983 | Kuckes | |
| 5,103,920 A * | 4/1992 | Patton ................ | E21B 47/02216 |
| | | | 175/45 |
| 5,131,477 A * | 7/1992 | Stagg ...................... | E21B 47/00 |
| | | | 166/66 |
| 5,230,387 A | 7/1993 | Waters et al. | |
| 5,524,709 A | 6/1996 | Withers | |
| 6,026,913 A | 2/2000 | Mandal et al. | |
| 8,570,834 B2 * | 10/2013 | McElhinney ............ | G01S 5/22 |
| | | | 367/127 |
| 9,243,489 B2 * | 1/2016 | Veeningen .............. | E21B 47/02 |
| 10,364,667 B2 * | 7/2019 | Cuthbert ................ | E21B 47/101 |
| 2009/0105957 A1 * | 4/2009 | Hsu ........................ | E21B 49/081 |
| | | | 702/12 |
| 2013/0118809 A1 | 5/2013 | Veeningen | |
| 2013/0301389 A1 | 11/2013 | Alford et al. | |
| 2013/0341094 A1 * | 12/2013 | Taherian ................. | E21B 21/08 |
| | | | 175/40 |
| 2016/0259079 A1 * | 9/2016 | Wilson ..................... | G01V 1/42 |
| 2017/0198567 A1 | 7/2017 | Cuthbert et al. | |
| 2018/0216452 A1 * | 8/2018 | Cramm .................. | G01V 1/284 |
| 2018/0252093 A1 * | 9/2018 | Cramm ................. | E21B 47/102 |

OTHER PUBLICATIONS

International Preliminary Report on Patentability issued in related PCT Application No. PCT/US2015/049408 dated Mar. 22, 2018, 15 pages.

* cited by examiner

PASSIVE RANGING USING ACOUSTIC ENERGY ORIGINATING FROM A TARGET WELLBORE

CROSS-REFERENCE TO RELATED APPLICATION

The present application is a U.S. National Stage Application of International Application No. PCT/US2015/049408 filed Sep. 10, 2015, which is incorporated herein by reference in its entirety for all purposes.

BACKGROUND

The present disclosure relates generally to wellbore ranging and, more particularly, to passive ranging techniques using acoustic energy originating from a target wellbore.

In some instances, hydrocarbons extracted from subterranean formations may inadvertently enter a well in an uncontrolled fashion, causing a blowout. Relief operations may include drilling a relief well to intersect or come in close proximity to the hydrocarbon influx in a target well. It is therefore desirable to obtain information about the location of the influx point with respect to the relief well during drilling. To do so, periodic ranging measurements may be taken while drilling; ranging measurements may be taken using active or passive techniques. Active techniques involve the use of excitation signals in determining ranging measurements, while passive techniques do not involve excitation signals in determining ranging measurements.

BRIEF DESCRIPTION OF THE DRAWINGS

For a more complete understanding of the present disclosure and its features and advantages, reference is now made to the following description, taken in conjunction with the accompanying drawings, in which.

Figure 1:
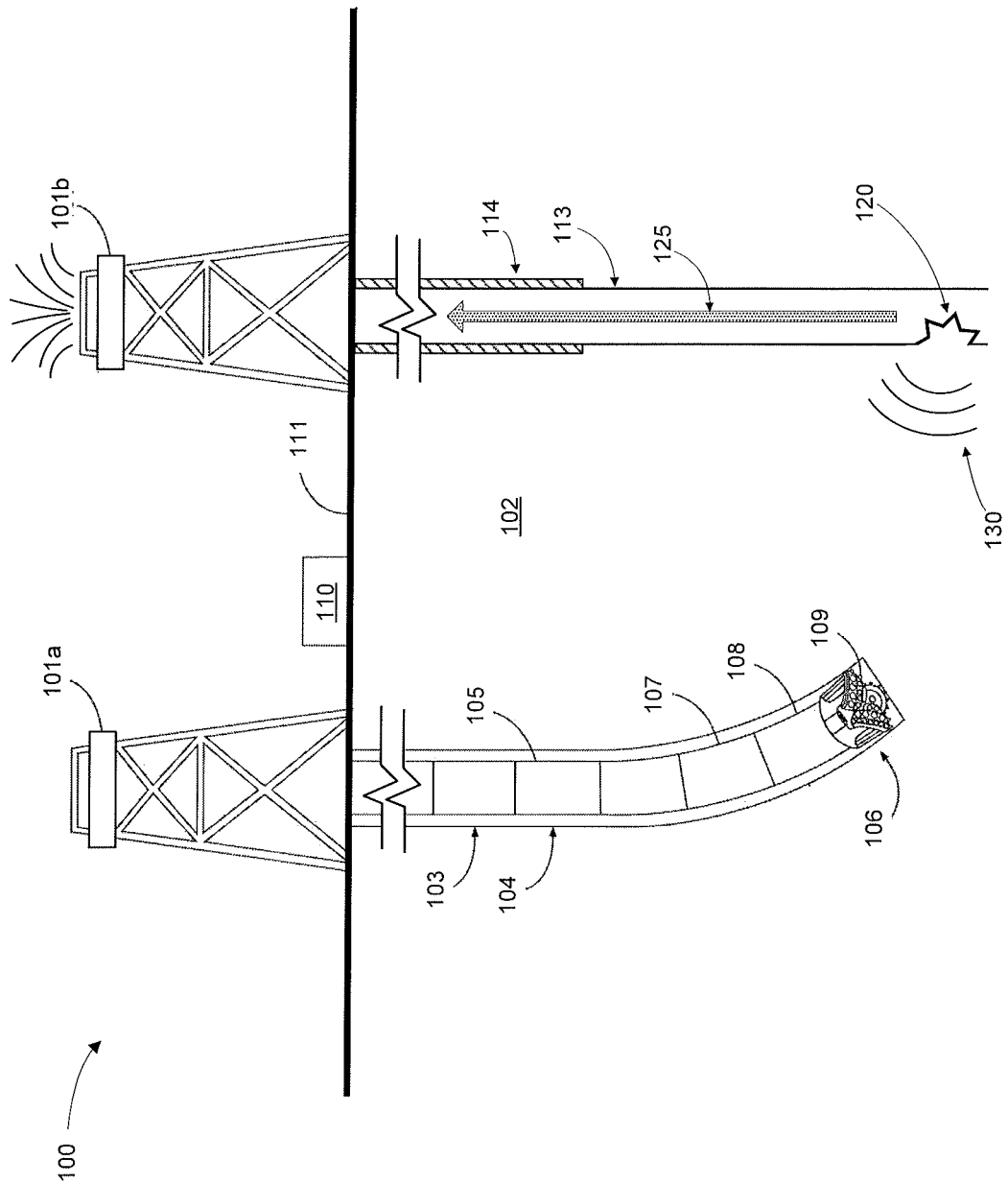
FIG. 1 illustrates an example downhole logging system used in a hydrocarbon drilling environment in accordance with embodiments of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure describes systems and methods for determining a distance and/or direction from a second wellbore (e.g., a relief well) to a first wellbore (e.g., a target well) using acoustic energy originating from the first wellbore. In particular, the distance and/or direction from the first wellbore to the first wellbore may be determined using acoustic energy originating naturally from a hydrocarbon influx within the first wellbore, without the use of acoustic excitation signals. This technique may be referred to as passive acoustic ranging.

In the field of well construction, drilling a relief well may provide a conduit for establishing hydraulic communications with a target well. Such procedures are most often employed when the relief well is drilled to "kill" the target well. A relief well may be drilled as a straight hole down to a planned kickoff point, where it is then turned toward the target well. Drilling is thereafter continued until the target well is located and the relief well is positioned or steered such that hydraulic communication between the two wells can be established. In order to accurately intercept the first well, ranging techniques may be employed. Typical ranging measurements in these situations may be performed using active or passive techniques. Active techniques involve the use of excitation signals (e.g., acoustic excitation signals) in determining the ranging measurements. On the other hand, passive techniques do not use excitation signals, but may require ferromagnetic casing in the target wellbore in order to determine the ranging measurements (e.g., by using magnetic signals).

However, in accordance with embodiments of the present disclosure, acoustic energy caused by one or more hydrocarbon influx in the target wellbore (e.g., kicks caused by imbalances between drilling fluid and formation fluid) may be detected using a logging tool disposed in the relief wellbore. The displacement of fluids at the influx may cause a release of acoustic energy (e.g., microseismic events) in the formation which may be detected and analyzed to determine the location of the influx (e.g., a distance and/or direction to the hydrocarbon influx). Doing so may provide an accurate means to range to the target well from the relief well using one or more modes of acquisition, including monopole (e.g., Stoneley), dipole (e.g., flexural), and quadrupole (e.g., screw) modes, which may provide comprehensive acoustic interpretation and evaluation of a given signature relating to the influx of formation fluids (e.g., hydrocarbons) at the influx in the formation/wellbore interface.

As an example, during drilling of the relief wellbore, an LWD apparatus disposed on a drill string in the relief well may detect one or more microseismic events caused by a hydrocarbon influx in the target wellbore. Based on the detected microseismic events, an estimated direction and distance to the influx of the target wellbore may be determined, and the drilling direction or trajectory of the relief may be modified or adjusted so that the relief well intersects the target wellbore near the influx location (to establish hydraulic communication between the two wells). Passive acoustic ranging techniques as described herein may not require any source of excitation signals as required by active ranging techniques, and may also not require any ferromagnetic casing as required by current passive ranging techniques, allowing the ranging measurements to be performed on an open, uncased target wellbore or portion of a wellbore.

In certain embodiments, once a location of an influx in the first wellbore is determined by a passive acoustic ranging measurement (e.g., by triangulation at multiple ranging depths, based on mapping the acoustic energy of the influx), a series of additional passive acoustic ranging measurement make be taken at further depths to reduce the ellipse of uncertainty surrounding the projected trajectory of the first wellbore. As the ellipses of uncertainty close to below a value of one, the additional ranging measurements better define the coordinates (e.g., x, y and z coordinates) of the anticipated target influx location of the first wellbore with increasing accuracy until close proximity or interception between the first wellbore and the first wellbore is established.

To facilitate a better understanding of the present disclosure, the following examples of certain embodiments are given. In no way should the following examples be read to limit, or define, the scope of the disclosure. Embodiments of the present disclosure and its advantages are best understood by referring to FIGS. 1 through 4, where like numbers are used to indicate like and corresponding parts.

FIG. 1 illustrates an example drilling system 100 in accordance with embodiments of the present disclosure. The drilling system 100 includes a rig 101 located at a surface 111 and positioned above a wellbore 103 within a subterranean formation 102. In certain embodiments, a drilling assembly 104 may be coupled to the rig 101 using a drill string 105. Although illustrated as an on-shore application, it will be understood that aspects of the present disclosure may be applied to off-shore drilling systems as well. The drilling assembly 104 may include a bottom hole assembly (BHA) 106. The BHA 106 may include a drill bit 109, a steering assembly 108, and a LWD/MWD apparatus 107. A control unit 110 located at the surface 111 may include a processor and memory device (e.g., a computing device similar to computing device 300 of FIG. 3), and may communicate with elements of the BHA 106, the LWD/MWD apparatus 107, and the steering assembly 108. The control unit 110 may receive data from and send control signals to the BHA 106. Additionally, at least one processor and memory device may be located downhole within the BHA 106 for the same purposes in certain embodiments. The LWD/MWD apparatus 107 may log the formation 102 (including aspects of wellbore 113) both while the wellbore 103 is being drilled, and after the wellbore is drilled to provide information regarding ongoing subterranean operations. LWD/MWD apparatus 107 may be an acoustic downhole logging tool similar to downhole logging tool 200 of FIG. 2, in certain embodiments. For example, LWD/MWD apparatus 107 may take periodic passive acoustic ranging measurements to determine a relative location of a hydrocarbon influx in wellbore 113 with respect to the end of wellbore 103 (i.e., near drill bit 109).

The steering assembly 108 may include a mud motor that provides power to the drill bit 109, and that is rotated along with the drill bit 109 during drilling operations. The mud motor may be a positive displacement drilling motor that uses the hydraulic power of the drilling fluid to drive the drill bit 109. In accordance with embodiments of the present disclosure, the BHA 106 may include an optionally non-rotatable portion. The optionally non-rotatable portion of the BHA 106 may include any of the components of the BHA 106 excluding the mud motor and the drill bit 109. For instance, the optionally non-rotatable portion may include a drill collar, the LWD/MWD apparatus 107, bit sub, stabilizers, jarring devices and crossovers. In certain embodiments, the steering assembly 108 may angle the drill bit 109 to drill at an angle from the wellbore 103. Maintaining the axial position of the drill bit 109 relative to the wellbore 103 may require knowledge of the rotational position of the drill bit 109 relative to the wellbore 103. Although described as incorporating a mud motor, it will be understood that the steering assembly may include any suitable motor for providing power to the drill bit 109.

Wellbore 103 may be relatively adjacent to wellbore 113, as shown in FIG. 1. Wellbore 113 may be an existing wellbore for a hydrocarbon producing well, or may be a wellbore being drilled simultaneously with wellbore 103 with a drilling system similar to rig 101 and its components 103-109. Portions of wellbore 113 may be encased by rigid materials, such as by cement or steel (e.g., casing 114 of FIG. 1). In particular embodiments, wellbore 103 may be drilled in such a way that it may intersect with wellbore 113 at a particular point, as described above. For example, wellbore 113 may be an existing well experiencing a blowout (the uncontrolled release of fluids 125) due to influx 120, which may be caused by an imbalance of formation fluids and drilling fluids near the site of influx 120. Accordingly, wellbore 103 may be drilled to be a relief well that intersects with wellbore 113 at or near influx 120 in order to establish hydraulic communication between the two wells. For instance, in particular embodiments, the drilling direction of wellbore 103 may be determined or adjusted based on acoustic signals 130 (i.e., passive acoustic ranging measurements) detected by LWD/MWD apparatus 107 disposed in wellbore 103. The passive acoustic ranging measurements taken by LWD/MWD apparatus 107 may include the detection (without the use of any excitation signal) of acoustic energy (e.g., microseismic events) in formation 102 caused by influx 120 in wellbore 113. Influx 120 may be due, for example, to an underground hydrocarbon or water influx at the interface of formation 102 and wellbore 113, and may create an acoustic signal which is detected by downhole wideband receivers on LWD/MWD apparatus, which may take monopole (Stoneley), dipole (flexural), and/or quadrupole (screw) measurements.

Any suitable technique may be used to determine the relative location of wellbore 113 using passive acoustic ranging techniques. For example, the depth and direction between the recording sensor of LWD/MWD apparatus 107 and the location of influx 120 may be determined from the particle motion of the direct P-wave and/or S-wave arrival, which may be polarized in the direction of propagation. As one example, the distance to influx 120 may be determined from the difference in arrival times between the P-waves and the S-waves. As another example, the arrival times of combinations of P-waves and/or S-waves at multiple depths may be used to triangulate the location of influx 120. As yet another example, the location of influx 120 may be determined by finding the point in the formation 102 that maximizes a semblance measure of the arrival of specific phases of P-waves and S-waves, removing the need for measuring the discrete arrival times of the waves.

Modifications, additions, or omissions may be made to FIG. 1 without departing from the scope of the present disclosure. For example, FIG. 1 illustrates components of drilling system 100 in a particular configuration. However, any suitable configuration of drilling components for drilling a relief well toward a target well may be used. Furthermore, although not illustrated in FIG. 1, it will be understood that wellbore 113 may include components for extracting hydrocarbons (e.g., where wellbore 113 is a hydrocarbon producing well). Furthermore, although illustrated as an LWD embodiment, it will be understood that aspects of the present disclosure may utilize a logging tool disposed on a wireline system in wellbore 103 to determine a direction and/or distance to influx 120 of wellbore 113.

Figure 2:
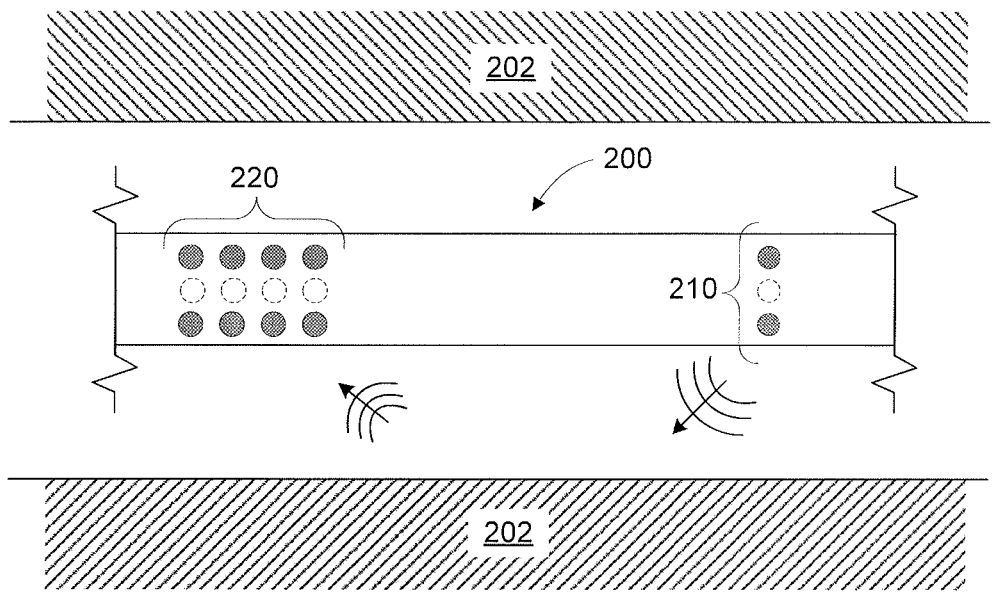
FIG. 2 illustrates an example downhole logging tool in accordance with embodiments of the present disclosure.

FIG. 2 illustrates an example downhole logging tool 200 in accordance with embodiments of the present disclosure. Downhole logging tool 200 may be a LWD apparatus disposed on a drill string (e.g., LWD/MWD apparatus 107 of FIG. 1) that is disposed in a wellbore in formation 202. For example, downhole logging tool 200 may include a HAL- LIBURTON QBAT or HALLIBURTON XBAT tool, in certain embodiments. Downhole logging tool 200 comprises transmitters 210 which may be operable to generate acoustic energy (e.g., seismic signals) in formation 202 for logging one or more characteristics of formation 202. Downhole logging tool further comprises receivers 220 which may be operable to detect acoustic energy (e.g., seismic or microseismic signals) in formation 202. The acoustic energy detected by receivers 220 may be in response to signals generated by transmitters 210. However, in accordance with embodiments of the present disclosure, receivers 220 may detect acoustic energy in formation 202 without the use of excitation signals generated by transmitters 210 or other sources. For instance, as described above, receivers 220 may be configured to detect acoustic wave caused by an influx in the wellbore/formation interface of another wellbore (e.g., a kick in a target wellbore). Receivers 220 may be configured in any suitable configuration on downhole logging tool 200. For example, receivers 220 may be configured in a tripole configuration as shown in FIG. 2, with the receivers 220 having 120 degrees of phase therebetween. Other embodiments may include monopole (i.e., receivers 220 facing one direction), dipole (receivers 220 having 180 degrees of phase difference therebetween), or quadrupole (receivers 220 having 90 degrees of phase difference therebetween) configurations of receivers 220.

As described herein, receivers 220 of downhole logging tool 200 may detect acoustic energy caused by one or more influxes in the target wellbore (e.g., kicks caused by imbalances between drilling fluid and formation fluid). Downhole logging tool 200 may then generate signals based on the detected acoustic energy received at each receiver. Using those signals, an estimated direction and/or distance to the influx of the target well may be determined. As one example, the distance to an influx in a target well may be determined based on the difference in arrival times between P-waves and S-waves at receivers 220. As another example, the arrival times of P-waves and/or S-waves at multiple depths may be used to triangulate the location of influx 120. As yet another example, the location of influx 120 may be determined by finding the point in the formation 102 that maximizes a semblance measure of the arrival of specific phases of P-waves and S-waves without the need for measuring the discrete arrival times of the waves. In other words, where multiple receivers 220 are included on downhole drilling tool 200, phase or amplitude differences in the signals generated for each receiver based on the detected acoustic waves (caused by the acoustic waves hitting the receivers at different locations on the tool at different times) may be used to determine an approximate direction to the influx. Such a determination may be made using triangulation techniques when the measurements are taken at various depths in the formation. Finally, based on the determined distance and/or direction, the drilling direction of the relief may be modified or adjusted so that the relief well intersects the target wellbore near the influx location.

Modifications, additions, or omissions may be made to FIG. 2 without departing from the scope of the present disclosure. For example, FIG. 2 illustrates a downhole logging tool 200 with a particular configuration of receivers 220. However, any suitable configuration of receivers 220 may be used.

Figure 3:
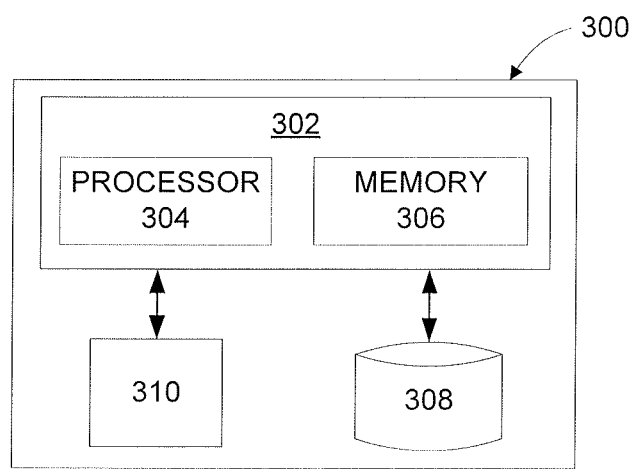
FIG. 3 illustrates a block diagram of an example computing system for use in a downhole logging system in accordance with embodiments of the present disclosure.

FIG. 3 illustrates a block diagram of an example computing system 300 in accordance with embodiments of the present disclosure. Computing system 300 may be used in one or more components of drilling system 100 of FIG. 1 or downhole logging tool 200 of FIG. 2. Computing system 300 or components thereof can be located at the surface (e.g., in control unit 110 of FIG. 1), downhole (e.g., in LWD/MWD apparatus 107 of FIG. 1 or downhole logging tool 200 of FIG. 2), or some combination of both locations (e.g., certain components may be disposed at the surface while certain other components may be disposed downhole, with the surface components being communicatively coupled to the downhole components).

Computing system 300 may be configured to determine a distance and direction to a point of a target well from a relief well based on detected acoustic energy in a formation caused by an influx in the target well, in accordance with the teachings of the present disclosure. For example, computing system 200 may be configured to receive signals from a downhole logging tool associated with acoustic waves caused by an influx in a target well, and determine, based on those received signals, a distance and/or direction toward the influx in the target well. In addition, computing system 300 may be configured to determine or adjust a drilling direction for a relief well based on the determined distance and/or direction to the influx in the target well.

In particular embodiments, computing system 300 may include wellbore ranging module 302. Wellbore ranging module 302 may include any suitable components. For example, in some embodiments, wellbore ranging module 302 may include processor 304. Processor 304 may include, for example a microprocessor, microcontroller, digital signal processor (DSP), application specific integrated circuit (ASIC), or any other digital or analog circuitry configured to interpret and/or execute program instructions and/or process data. In some embodiments, processor 304 may be communicatively coupled to memory 306. Processor 304 may be configured to interpret and/or execute program instructions or other data retrieved and stored in memory 306. Program instructions or other data may constitute portions of software 308 for carrying out one or more methods described herein. Memory 306 may include any system, device, or apparatus configured to hold and/or house one or more memory modules; for example, memory 306 may include read-only memory, random access memory, solid state memory, or disk-based memory. Each memory module may include any system, device or apparatus configured to retain program instructions and/or data for a period of time (e.g., computer-readable non-transitory media). For example, instructions from software 308 may be retrieved and stored in memory 306 for execution by processor 304.

In particular embodiments, wellbore ranging module 302 may be communicatively coupled to one or more displays 310 such that information processed by wellbore ranging module 302 may be conveyed to operators of drilling and logging equipment. For example, wellbore ranging module 302 may transmit the distance and/or direction information associated with the influx in the target well to display 310 for display to an operator of a drilling system.

Modifications, additions, or omissions may be made to FIG. 3 without departing from the scope of the present disclosure. For example, FIG. 3 shows a particular configuration of components of computing system 300. However, any suitable configurations of components may be used. For example, components of computing system 300 may be implemented either as physical or logical components. Furthermore, in some embodiments, functionality associated with components of computing system 300 may be implemented in special purpose circuits or components. In other embodiments, functionality associated with components of computing system 300 may be implemented in configurable general purpose circuit or components. For example, components of computing system 300 may be implemented by configured computer program instructions.

Figure 4:
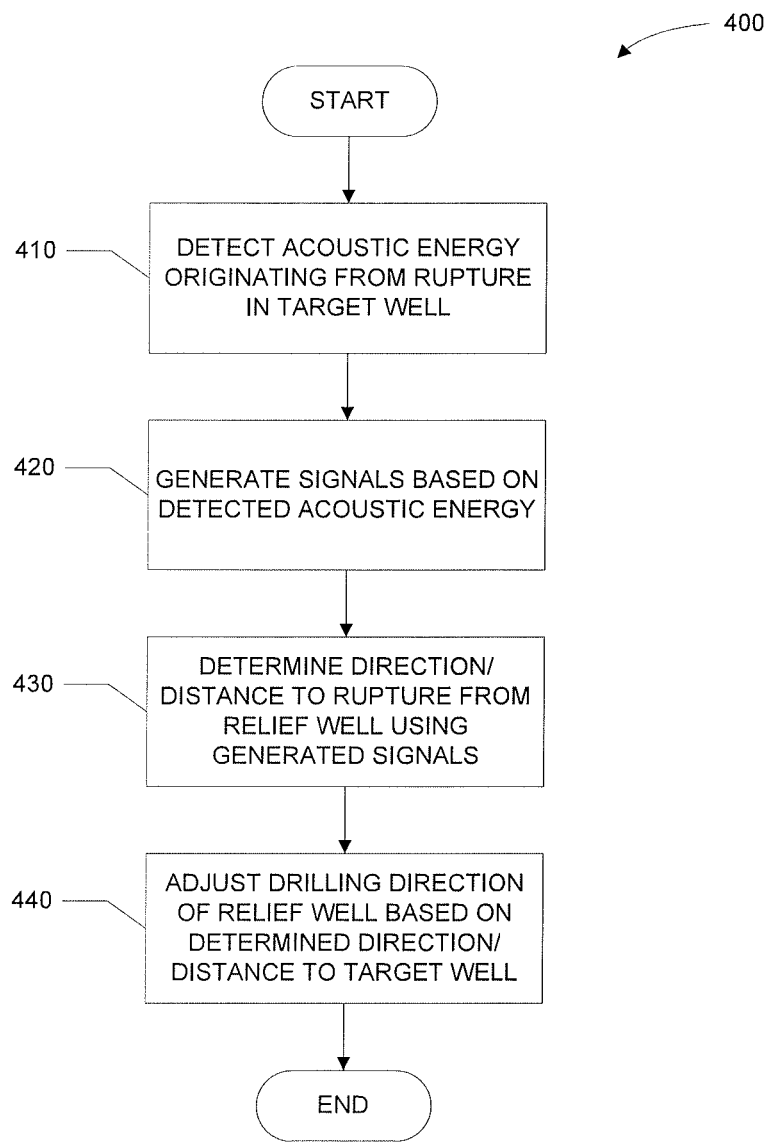
FIG. 4 illustrates an example method for performing passive acoustic ranging using acoustic velocity measurements in accordance with embodiments of the present disclosure.

FIG. 4 illustrates an example method 400 for performing passive acoustic ranging using acoustic velocity measurements in accordance with embodiments of the present disclosure. The method begins at step 410, where acoustic energy originating from an influx in a target well is detected. The detected acoustic energy may be due to microseismic events caused by the influx of formation fluids at the formation/wellbore interface in the target well (i.e., kicks). The acoustic energy may be detected using a downhole logging tool coupled to a drill string in a relief well being drilled to intersect the target well, for example. The downhole logging tool may comprise one or more receivers for detecting the acoustic energy. Such receivers may be in any suitable configuration on the downhole logging tool, such as in a monopole, dipole, tripole, or quadrupole configuration. Then, at step 420, one or more signals based on the detected acoustic energy may be generated. Each signal may be based on the acoustic energy detected at a particular receiver of the downhole logging tool. For example, the downhole logging tool may generate a signal for each receiver disposed thereon, with the signal representing the acoustic energy detected at the particular receiver.

At step 430, a direction and/or distance from the relief well to the target well are determined using the signals generated at step 420. The distance and direction may be from the end of the relief well (i.e., near the drill bit) to a particular point (e.g., the influx) of the target well. The distance to the target well may be determined based on the difference in arrival times between P-waves and S-waves at the downhole logging tool in the relief well, for instance. The arrival times of P-waves and/or S-waves at multiple depths may be used to triangulate the direction from the relief well to the influx of the target well. Furthermore, phase and/or amplitude differences in signals generated for each receiver on the downhole logging tool (caused by the acoustic energy arriving at different times) may be used to determine an approximate direction to the influx in the target well. Triangulation techniques may be used when the measurements are taken at multiple depths in the formation.

Finally, at step 440, a drilling direction for the relief well is adjusted based on the determined direction or distance to the target well from the relief well. For instance, once a direction and distance to an influx in the target well is determined, the direction of the relief well drilling may be steered in the determined direction to the influx in the target well. A series of additional passive acoustic ranging measurements make be taken at further depths to reduce the ellipse of uncertainty surrounding the projected trajectory of the relief well. As the ellipses of uncertainty close to below a value of one, for instance, the additional ranging measurements may allow for "zeroing in" on the anticipated intersection location of the target wellbore with increasing accuracy until close proximity or interception between the relief well and the target well is established.

Modifications, additions, or omissions may be made to method 400 without departing from the scope of the present disclosure. For example, the order of the steps may be performed in a different manner than that described and some steps may be performed at the same time. Additionally, each individual step may include additional steps without departing from the scope of the present disclosure.

To provide illustrations of one or more embodiments of the present disclosure, the following examples are provided.

In one or more embodiments, a system comprises a first wellbore disposed in a formation, the first wellbore having a pressure imbalance therein causing an influx of formation fluids, a second wellbore disposed in the formation, a drill string disposed in the second wellbore, the drill string comprising a drill bit and a logging tool, and a wellbore ranging module comprising a processor and memory, the wellbore ranging module coupled to the drill string. The logging tool is configured to detect acoustic energy originating from the influx in the first wellbore and generate one or more signals associated with the detected acoustic energy. The wellbore ranging module is configured to receive, from the logging tool, the one or more signals associated with the detected acoustic energy and determine, using the received signals, a direction from the drill bit to the influx of the first wellbore.

In one or more embodiments described in the preceding paragraph, the wellbore ranging module is further configured to adjust a trajectory of the drill bit based on the determined direction to the influx of the first wellbore.

In one or more embodiments described in the preceding two paragraphs, the direction from the drill bit to the influx is determined based at least in part on arrival times of P-waves and arrival times of S-waves.

In one or more embodiments described in the preceding three paragraphs, the direction from the drill bit to the influx is determined based at least in part on the difference between the arrival times of the P-waves and the arrival times of the S-waves.

In one or more embodiments described in the preceding four paragraphs, the direction from the drill bit to the influx is determined based at least in part on triangulation using the arrival times of the P-waves and the arrival times of the S-waves a plurality of depths in the formation.

In one or more embodiments described in the preceding five paragraphs, the direction from the drill bit to the influx is determined based at least in part on arrival times of the acoustic energy at two or more receivers of the logging tool.

In one or more embodiments described in the preceding six paragraphs, the direction from the drill bit to the influx is determined based at least in part on the difference between a first arrival time of the acoustic energy at a first receiver of the logging tool and a second arrival time of the acoustic energy at a second receiver of the logging tool.

In one or more embodiments described in the preceding seven paragraphs, the direction from the drill bit to the influx is determined based at least in part on arrival times of the acoustic energy at a plurality of depths in the formation.

In one or more embodiments described in the preceding eight paragraphs, the wellbore ranging module is further configured to determine a distance from the drill bit to the influx.

In one or more embodiments described in the preceding nine paragraphs, the distance from the drill bit to the influx is determined based at least in part on arrival times of P-waves and S-waves.

In one or more embodiments described in the preceding ten paragraphs, the distance from the drill bit to the influx is determined based at least in part on a difference between the arrival times of the P-waves and the arrival times of the S-waves.

In one or more embodiments described in the preceding eleven paragraphs, the logging tool comprises dipole receivers.

In one or more embodiments described in the preceding twelve paragraphs, the logging tool comprises quadrupole receivers.

In one or more embodiments, a method comprises the steps of detecting, at a logging tool, acoustic energy originating from an influx in a target wellbore, generating one or more signals associated with the detected acoustic energy, and determining, using the generated signals, a direction to the influx in the target wellbore.

In one or more embodiments described in the preceding paragraph, the method further comprises the steps of drilling a relief wellbore using a drill string comprising a drill bit and adjusting a trajectory of the drill bit in the relief wellbore based at least in part on the determined direction to the influx of the target wellbore.

In one or more embodiments described in the preceding two paragraphs, the direction to the influx in the target wellbore is determined based at least in part on arrival times of P-waves and arrival times of S-waves.

In one or more embodiments described in the preceding three paragraphs, the direction to the influx in the target wellbore is determined based at least in part on the difference between the arrival times of the P-waves and the arrival times of the S-waves.

In one or more embodiments described in the preceding four paragraphs, the direction to the influx in the target wellbore is determined based at least in part on triangulation using the arrival times of the P-waves and the arrival times of the S-waves a plurality of depths in the formation.

In one or more embodiments described in the preceding five paragraphs, the direction to the influx in the target wellbore is determined based at least in part on arrival times of the acoustic energy at two or more receivers of the logging tool.

In one or more embodiments described in the preceding six paragraphs, the direction to the influx in the target wellbore is determined based at least in part on the difference between a first arrival time of the acoustic energy at a first receiver of the logging tool and a second arrival time of the acoustic energy at a second receiver of the logging tool.

In one or more embodiments described in the preceding seven paragraphs, the direction to the influx in the target wellbore is determined based at least in part on arrival times of the acoustic energy at a plurality of depths in the formation.

In one or more embodiments described in the preceding eight paragraphs, the method further comprises the step of determining a distance to the influx in the target wellbore.

In one or more embodiments described in the preceding nine paragraphs, the distance to the influx in the target wellbore is determined based at least in part on arrival times of P-waves and S-waves.

In one or more embodiments described in the preceding ten paragraphs, the distance to the influx in the target wellbore is determined based at least in part on a difference between the arrival times of the P-waves and the arrival times of the S-waves.

In one or more embodiments, a computer-readable medium comprises instructions that are configured, when executed by a processor, to generate one or more signals associated with acoustic energy detected by a logging tool, the acoustic energy originating from an influx in a target wellbore, and determine, using the generated signals, a direction to the influx in the target wellbore.

In one or more embodiments described in the preceding paragraph, the instructions are further configured to adjust a trajectory of a drill bit in a relief wellbore based on the determined direction to the influx in the target wellbore.

In one or more embodiments described in the preceding two paragraphs, the direction to the influx is determined based at least in part on arrival times of P-waves and arrival times of S-waves.

In one or more embodiments described in the preceding three paragraphs, the direction to the influx is determined based at least in part on the difference between the arrival times of the P-waves and the arrival times of the S-waves.

In one or more embodiments described in the preceding four paragraphs, the direction to the influx is determined based at least in part on triangulation using the arrival times of the P-waves and the arrival times of the S-waves a plurality of depths in the formation.

In one or more embodiments described in the preceding five paragraphs, the direction to the influx is determined based at least in part on arrival times of the acoustic energy at two or more receivers of the logging tool.

In one or more embodiments described in the preceding six paragraphs, the direction to the influx is determined based at least in part on the difference between a first arrival time of the acoustic energy at a first receiver of the logging tool and a second arrival time of the acoustic energy at a second receiver of the logging tool.

In one or more embodiments described in the preceding seven paragraphs, the direction to the influx is determined based at least in part on arrival times of the acoustic energy at a plurality of depths in the formation.

In one or more embodiments described in the preceding eight paragraphs, the instructions are further configured to determine a distance from a drill bit to the influx.

In one or more embodiments described in the preceding nine paragraphs, the distance from the drill bit to the influx is determined based at least in part on arrival times of P-waves and S-waves.

In one or more embodiments described in the preceding ten paragraphs, the distance from the drill bit to the influx is determined based at least in part on a difference between the arrival times of the P-waves and the arrival times of the S-waves.

The present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. Consequently, the disclosure is intended to be limited only by the spirit and scope of the appended claims, giving full cognizance to equivalents in all respects. The terms in the claims have their plain, ordinary meaning unless otherwise explicitly and clearly defined by the patentee.

The terms "couple" or "couples" as used herein are intended to mean either an indirect or a direct connection. Thus, if a first device couples to a second device, that connection may be through a direct connection, or through an indirect mechanical, electrical, or acoustic connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections. Finally, the term "uphole" as used herein means along the drill string or the hole from the distal end towards the surface, and "downhole" as used herein means along the drill string or the hole from the surface towards the distal end.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive, floppy disk drive, or cloud), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

What is claimed is:

1. A system, comprising:
    a first wellbore disposed in a formation, the first wellbore having a pressure imbalance therein causing an influx of formation fluids;
    a second wellbore disposed in the formation;
    a drill string disposed in the second wellbore, the drill string comprising a drill bit and a logging tool, wherein the logging tool comprises tripole receivers, wherein there is a phase difference of 120 degrees between each receiver in a set of tripole receivers, wherein the tripole receivers are configured to detect acoustic energy as one or more passive acoustic ranging measurements originating from the influx in the first wellbore, wherein the logging tool is configured to use triangulation techniques with the measurements taken at various depths from each set of tripole receivers, wherein the logging tool is configured to
    generate one or more signals associated with the detected acoustic energy; and
    a wellbore ranging module comprising a processor and memory, the wellbore ranging module coupled to the drill string and configured to:
        receive, from the logging tool, the one or more signals associated with the detected acoustic energy; and
        determine, using the received signals, a direction, depth, and distance from the drill bit to the influx of the first wellbore so as to steer the drill bit to establish a hydraulic communication between the second wellbore and the first wellbore.

2. The system of claim 1, wherein the wellbore ranging module is further configured to adjust a trajectory of the drill bit based on the determined direction, depth, and distance to the influx of the first wellbore.

3. The system of claim 1, wherein the direction from the drill bit to the influx is determined based at least in part on arrival times of P-waves and arrival times of S-waves.

4. The system of claim 3, wherein the direction from the drill bit to the influx is determined based at least in part on the difference between the arrival times of the P-waves and the arrival times of the S-waves.

5. The system of claim 3, wherein the direction from the drill bit to the influx is determined based at least in part on triangulation using the arrival times of the P-waves and the arrival times of the S-waves a plurality of depths in the formation.

6. The system of claim 1, wherein the direction from the drill bit to the influx is determined based at least in part on arrival times of the acoustic energy at two or more receivers of the logging tool.

7. The system of claim 6, wherein the direction from the drill bit to the influx is determined based at least in part on the difference between a first arrival time of the acoustic energy at a first receiver of the logging tool and a second arrival time of the acoustic energy at a second receiver of the logging tool.

8. The system of claim 6, wherein the direction from the drill bit to the influx is determined based at least in part on arrival times of the acoustic energy at a plurality of depths in the formation.

9. The system of claim 1, wherein the distance from the drill bit to the influx is determined based at least in part on arrival times of P-waves and S-waves.

10. The system of claim 1, wherein the distance from the drill bit to the influx is determined based at least in part on a difference between the arrival times of the P-waves and the arrival times of the S-waves.

11. A method, comprising:
    detecting, at a logging tool, acoustic energy, as one or more passive acoustic ranging measurements originating from an influx in a target wellbore, wherein the logging tool comprises tripole receivers, wherein there is a phase difference of 120 degrees between each receiver in a set of tripole receivers, wherein the tripole receivers are configured to detect the acoustic energy, wherein the logging tool is configured to use triangulation techniques with the measurements taken at various depths from each set of tripole receivers;
    generating one or more signals associated with the detected acoustic energy; and
    determining, using the generated signals, a direction, depth, and distance to the influx in the target wellbore so as to establish a hydraulic communication between a relief wellbore and the target wellbore.

12. The method of claim 11, further comprising:
    drilling the relief wellbore using a drill string comprising a drill bit; and
    adjusting a trajectory of the drill bit in the relief wellbore based at least in part on the determined direction, depth, and direction to the influx of the target wellbore.

13. The method of claim 11, wherein the direction to the influx in the target wellbore is determined based at least in part on arrival times of P-waves and arrival times of S-waves.

14. The method of claim 13, wherein the direction to the influx in the target wellbore is determined based at least in part on the difference between the arrival times of the P-waves and the arrival times of the S-waves.

15. The method of claim 13, wherein the direction to the influx in the target wellbore is determined based at least in part on triangulation using the arrival times of the P-waves and the arrival times of the S-waves a plurality of depths in the formation.

16. The method of claim 11, wherein the direction to the influx in the target wellbore is determined based at least in part on arrival times of the acoustic energy at two or more receivers of the logging tool.

17. The method of claim 16, wherein the direction to the influx in the target wellbore is determined based at least in part on the difference between a first arrival time of the acoustic energy at a first receiver of the logging tool and a second arrival time of the acoustic energy at a second receiver of the logging tool.

18. The method of claim 16, wherein the direction to the influx in the target wellbore is determined based at least in part on arrival times of the acoustic energy at a plurality of depths in the formation.

19. The method of claim 11, wherein the distance to the influx in the target wellbore is determined based at least in part on arrival times of P-waves and S-waves.

20. The method of claim 11, wherein the distance to the influx in the target wellbore is determined based at least in part on a difference between the arrival times of the P-waves and the arrival times of the S-waves.

21. A computer-readable medium comprising instructions that are configured, when executed by a processor, to:
generate one or more signals associated with acoustic energy detected, as one or more passive acoustic ranging measurements, by a logging tool, the acoustic energy originating from an influx in a target wellbore, wherein the logging tool comprises tripole receivers, wherein there is a phase difference of 120 degrees between each receiver in a set of tripole receivers, wherein the tripole receivers are configured to detect the acoustic energy, wherein generating one or more signals comprises utilizing triangulation techniques with the measurements taken at various depths from each set of tripole receivers; and
determine, using the generated signals, a direction, depth, and distance to the influx in the target wellbore so as to establish a hydraulic communication between a relief wellbore and the target wellbore.

22. The computer-readable medium of claim 21, wherein the instructions are further configured to adjust a trajectory of a drill bit in a relief wellbore based on the determined direction to the influx in the target wellbore.

23. The computer-readable medium of claim 21, wherein the direction to the influx is determined based at least in part on arrival times of P-waves and arrival times of S-waves.

24. The computer-readable medium of claim 23, wherein the direction to the influx is determined based at least in part on the difference between the arrival times of the P-waves and the arrival times of the S-waves.

25. The computer-readable medium of claim 23, wherein the direction to the influx is determined based at least in part on triangulation using the arrival times of the P-waves and the arrival times of the S-waves a plurality of depths in the formation.

26. The computer-readable medium of claim 21, wherein the direction to the influx is determined based at least in part on arrival times of the acoustic energy at two or more receivers of the logging tool.

27. The computer-readable medium of claim 26, wherein the direction to the influx is determined based at least in part on the difference between a first arrival time of the acoustic energy at a first receiver of the logging tool and a second arrival time of the acoustic energy at a second receiver of the logging tool.

28. The computer-readable medium of claim 26, wherein the direction to the influx is determined based at least in part on arrival times of the acoustic energy at a plurality of depths in the formation.

29. The computer-readable medium of claim 21, wherein the distance from the drill bit to the influx is determined based at least in part on arrival times of P-waves and S-waves.

30. The computer-readable medium of claim 21, wherein the distance from the drill bit to the influx is determined based at least in part on a difference between the arrival times of the P-waves and the arrival times of the S-waves.

* * * * *